Patented Apr. 28, 1931

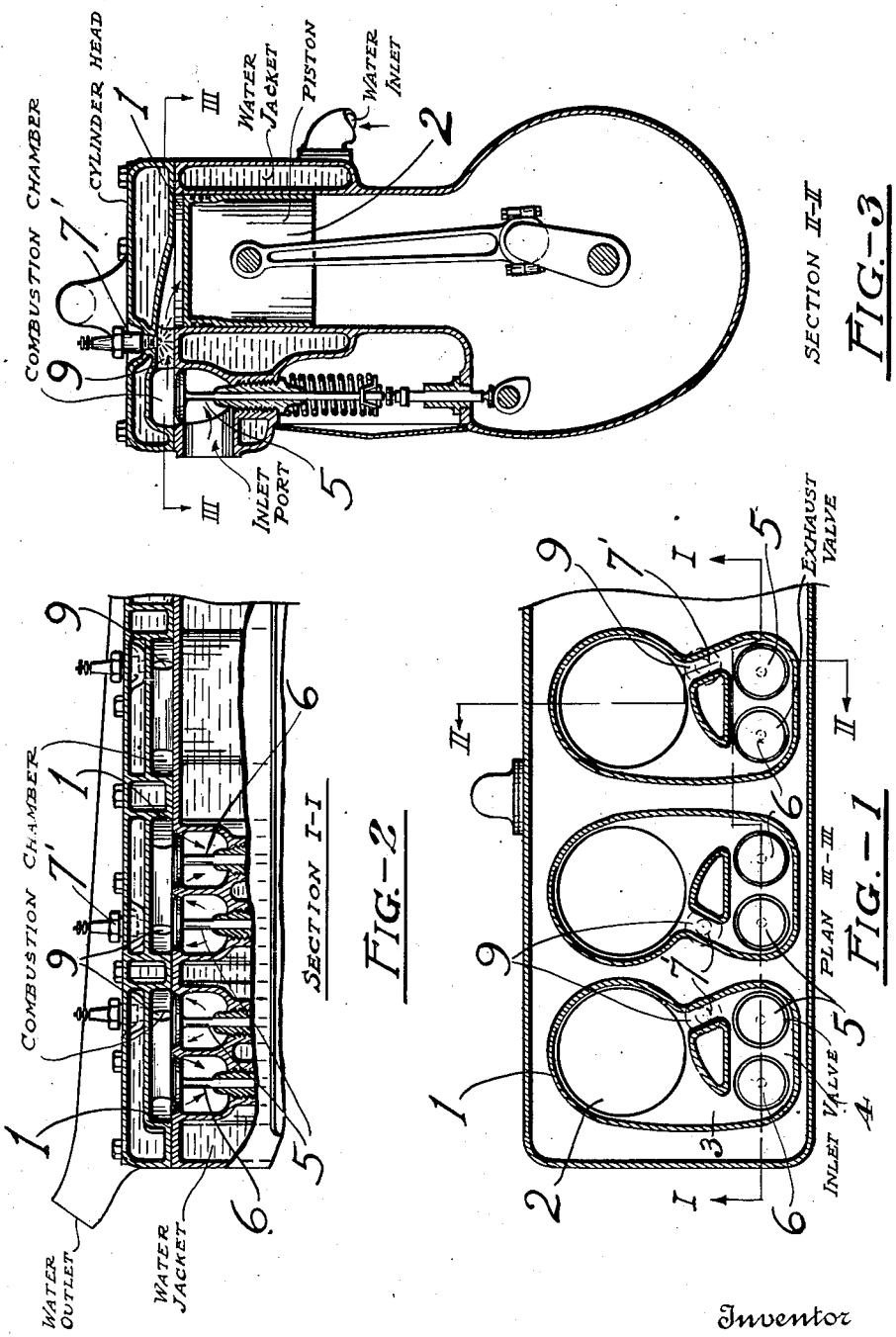

1,803,102

UNITED STATES PATENT OFFICE

EARLE W. EVANS, OF LINDEN, NEW JERSEY, ASSIGNOR TO STANDARD OIL DEVELOPMENT COMPANY, A CORPORATION OF DELAWARE

CYLINDER HEAD FOR INTERNAL-COMBUSTION ENGINES

Application filed May 19, 1928. Serial No. 278,930.

This invention relates to a form of cylinder head for internal combustion engines and will be understood from the following description read in conjunction with the annexed drawings, in which Fig. 1 is a fragmentary cross section through a preferred form of the cylinder head which I have invented;

Fig. 2 is a vertical section through the same on the broken plane denoted by the line I—I on Fig. 1; and Fig. 3 is a vertical section through the same on the broken plane denoted by the line II—II on Fig. 1.

Referring to the drawings, each piston chamber 1 contains a piston 2 of circular cross section. Each piston chamber is in communication through a passage 3, with a valve chamber 4, in which are located intake valve 5 and exhaust valve 6. It will be noted that exhaust valve 6 is adjacent the point of communication between the two chambers so that substantially all of the charge passing to the piston chamber from the intake valve 5 will pass directly over the exhaust valve, thereby simultaneously cooling the exhaust valve and preheating the charge. The outlet of the valve chamber is preferably only slightly wider than the exhaust valve, so as to concentrate the flow of the charge over that valve.

Details of construction will be apparent from Figs. 2 and 3.

I provide a subordinate or auxiliary means of communication between the piston chamber 1 and the valve chamber 2. This consists of a by-pass 9 of substantially smaller cross section than the passage 3. Therefore, most of the charge indrawn through the intake valve passes over the exhaust valve as described above. However, in this form of construction, the ignition of the charge, whether propagated in the valve chamber or piston chamber, is communicated through two separate and distinct channels. In the preferred form of construction with this alternative device, I place an ignition means 7' in the by-pass 9 whereby an explosion of the charge during operation is immediately communicated to both the valve and piston chambers.

The foregoing specific description is for purposes of illustration and not by way of limitation. It is my intention that the invention be limited only by the appended claims or their equivalents in which I have endeavored to claim broadly all inherent novelty.

I claim:

1. In an internal combustion engine, a piston chamber, a valve chamber, an intake and an exhaust valve in said valve chamber, a passage between the said piston chamber and the said valve chamber adjacent the said exhaust valve and so formed that the major part of the charge indrawn through the said intake valve passes over the said exhaust valve, and a by-pass connecting the said piston chamber with the said valve chamber at a point remote from the said exhaust valve, the said by-pass being of substantially smaller cross section than said passage.

2. Apparatus according to claim 1, in which ignition means are located in said by-pass.

3. In an internal combustion engine, a piston chamber, a valve chamber, an intake and an exhaust valve in the valve chamber, the valve chamber having an opening on the far side of the exhaust valve from the intake valve and communicating with the piston chamber, the piston chamber and valve chamber communicating through an opening of lesser diameter than the first mentioned opening and disposed on the far side of the intake valve from the exhaust valve.

4. In an internal combustion engine, a piston chamber, a valve chamber, an intake and an exhaust valve in the valve chamber, the valve chamber having an opening on the far side of the exhaust valve from the intake valve and communicating with the piston chamber, the piston chamber and valve chamber communicating through an opening of lesser diameter than the first mentioned opening and disposed on the far side of the intake valve from the exhaust valve, and an ignition means disposed in the last mentioned opening.

5. In an internal combustion engine, a piston chamber, a valve chamber, an intake and an exhaust valve in the valve chamber, the valve chamber having an opening on the far side of the exhaust valve from the intake valve and communicating with the piston chamber, a passageway connecting the piston chamber and valve chamber on the far side of the intake valve from the exhaust valve and of lesser diameter than the opening, and ignition means disposed in the passageway.

6. In an internal combustion engine, a piston chamber, a valve chamber, an intake and an exhaust valve in the valve chamber, the valve chamber having an opening on the far side of the exhaust valve from the intake valve and communicating with the piston chamber, the portion of the wall of the valve chamber adjoining the exhaust valve converging toward the latter.

EARLE W. EVANS.